United States Patent
Park

(10) Patent No.: US 12,068,845 B2
(45) Date of Patent: Aug. 20, 2024

(54) APPARATUS AND METHOD FOR SUPPORTING PRECISION TIME SYNCHRONIZATION PROTOCOL OF STEALTH CLOCK TYPE

(71) Applicant: KOREA ELECTRONICS TECHNOLOGY INSTITUTE, Seongnam-si (KR)

(72) Inventor: Pusik Park, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 92 days.

(21) Appl. No.: 17/836,563

(22) Filed: Jun. 9, 2022

(65) Prior Publication Data
US 2023/0024329 A1    Jan. 26, 2023

(30) Foreign Application Priority Data
Jul. 26, 2021    (KR) .................. 10-2021-0097810

(51) Int. Cl.
   *H04J 3/06*     (2006.01)
   *H04W 56/00*    (2009.01)

(52) U.S. Cl.
   CPC ............ *H04J 3/0667* (2013.01); *H04J 3/065* (2013.01); *H04W 56/0045* (2013.01)

(58) Field of Classification Search
   CPC .... H04J 3/0667; H04J 3/065; H04W 56/0045
   See application file for complete search history.

(56) References Cited

U.S. PATENT DOCUMENTS

| | | | |
|---|---|---|---|
| 8,693,506 B2* | 4/2014 | Hadzic | H04J 3/0697 370/352 |
| 9,112,631 B2* | 8/2015 | Aweya | H04J 3/0664 |
| 9,432,751 B2* | 8/2016 | Joergensen | H04B 10/40 |

(Continued)

FOREIGN PATENT DOCUMENTS

| | | |
|---|---|---|
| JP | 2021-093695 A | 6/2021 |
| KR | 10-2011-0056087 A | 5/2011 |
| KR | 10-2013-0126986 A | 11/2013 |

OTHER PUBLICATIONS

Notice of Allowance issued on Jan. 16, 2023 of Korean Patent Application No. 10-2021-0097810.

*Primary Examiner* — Bailor C Hsu
(74) *Attorney, Agent, or Firm* — Knobbe, Martens, Olson & Bear, LLP

(57) ABSTRACT

An apparatus and method for supporting a precision time synchronization protocol of a stealth clock type are provided. The method may be performed by a stealth clock follower device and may include transmitting a sync message received from a neighbor device to an end-follower device, receiving a delay-request message from the end-follower device, and updating a residence time in a correction field of the received delay-request message. The method may also include transmitting the updated delay-request message to a leader device, receiving a delay-response message from the leader device, and performing time synchronization based on a time of the leader device by using an ingress time of the sync message, an egress time of the updated delay-request message, and time information contained in the sync message and the delay response-message. The method may further include transmitting the delay-response message to the end-follower device for time-synchronization.

10 Claims, 14 Drawing Sheets

(56) References Cited

U.S. PATENT DOCUMENTS

| | | | | |
|---|---|---|---|---|
| 10,084,559 B1* | 9/2018 | Devineni | ............ | H04J 3/0661 |
| 10,855,388 B2* | 12/2020 | Joseph | ................ | H04J 3/0667 |
| 11,018,789 B2* | 5/2021 | Aweya | ................ | H04J 3/0644 |
| 11,177,897 B2* | 11/2021 | Evans | ................ | H04J 3/0673 |
| 11,503,557 B2* | 11/2022 | Aijaz | ................ | H04W 56/007 |
| 11,750,311 B1* | 9/2023 | Devarajan | ............ | H04J 3/0667 |
| | | | | 370/503 |
| 2013/0227008 A1* | 8/2013 | Yang | .................. | H04J 3/0667 |
| | | | | 709/204 |
| 2015/0318941 A1 | 11/2015 | Zheng et al. | | |
| 2022/0224501 A1* | 7/2022 | Lesi | ...................... | H04L 69/28 |
| 2022/0303929 A1* | 9/2022 | Chowdhury | .......... | H04L 7/0033 |
| 2022/0345290 A1* | 10/2022 | Matsumoto | ........... | H04J 3/0667 |

\* cited by examiner

FIG. 6
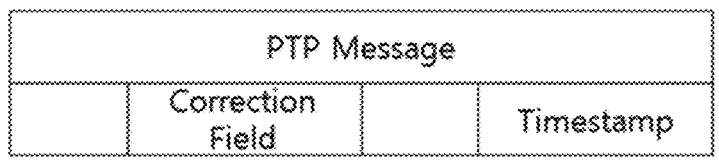
(a)
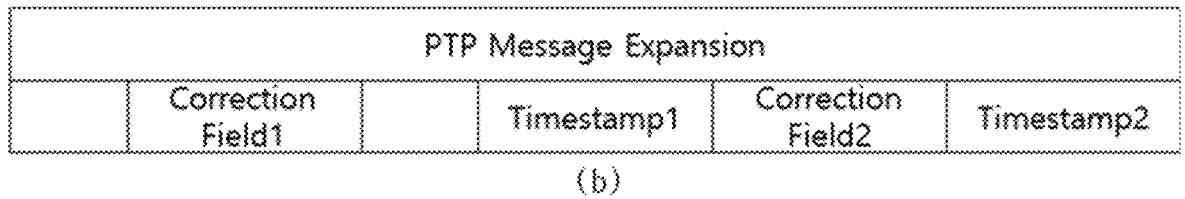
(b)

APPARATUS AND METHOD FOR SUPPORTING PRECISION TIME SYNCHRONIZATION PROTOCOL OF STEALTH CLOCK TYPE

CROSS-REFERENCE TO RELATED APPLICATION

The present application claims priority to Korean Patent Application No. 10-2021-0097810 filed on Jul. 26, 2021 in the Korean Intellectual Property Office, which is incorporated herein in its entirety by reference.

TECHNICAL FIELD

The present disclosure relates to precision time synchronization protocol technology, and more particularly, to a system and method for supporting a precision time synchronization protocol of a stealth clock type that reduces bandwidth and performs failure recovery through an efficient time synchronization protocol in a linear network.

SUMMARY

The present disclosure provides a system and method for supporting a precision time synchronization protocol of a stealth clock type for calculating node delay times of delay request messages of all follower nodes with a small number of messages in a linear network.

According to the present disclosure, a method for supporting a precision time synchronization protocol of a stealth clock type implemented in a linear network may include transmitting, by a stealth clock follower device, a sync message received from a neighbor device to an end-follower device; receiving, by the stealth clock follower device, a delay-request message generated by using the sync message from the end-follower device; updating, by the stealth clock follower device, a residence time in a correction field of the received delay-request message; transmitting, by the stealth clock follower device, the updated delay-request message to a leader device; receiving, by the stealth clock follower device, a delay-response message generated by using the updated delay-request message from the leader device; performing, by the stealth clock follower device, time synchronization based on a time of the leader device by using an ingress time of the sync message, an egress time of the updated delay-request message, and time information contained in the sync message and the delay response-message; and transmitting, by the stealth clock follower device, the delay-response message to the end-follower device such that the end-follower device is time-synchronized based on the time of the leader device.

In addition, the method may further include, before transmitting the sync message to the end-follower device, measuring and recording, by the stealth clock follower device, an ingress time of receiving the sync message; and updating, by the stealth clock follower device, a node delay time of the sync message in a correction field of the sync message.

In addition, the method may further include, before receiving the delay-request message, transmitting, by the stealth clock follower device, a follow-up message received from the leader device to at least one end-follower device.

In addition, the method may further include, after transmitting the updated delay-request message to the leader device, measuring and recording an egress time of the updated delay-request message.

In addition, at least one of the sync message, the delay-request message, and the delay-response message may include at least one timestamp field and a number of correction fields corresponding to the timestamp field.

According to the present disclosure, an apparatus for supporting a precision time synchronization protocol of a stealth clock type implemented in a linear network may include an network interface controller (NIC) configured to receive a time synchronization message including a sync message, a delay-request message, and a delay-response message being a response message to the delay-request message, and to transmit the received message in a direction opposite to a reception direction; a PTP engine configured to update a residence time in a correction field of the delay-request message, and to perform time synchronization based on a time of a leader device by using an ingress time of the sync message, an egress time of the delay-request message, and time information contained in the sync message and the delay response-message; and a device driver located between the NIC and the PTP engine and configured to transmit the time synchronization message received by the NIC to the PTP engine.

In addition, the PTP engine may be configured to measure an ingress time of the sync message and an egress time of the delay-request message.

In addition, at least one of the sync message, the delay-request message, and the delay-response message may include at least one timestamp field and a number of correction fields corresponding to the timestamp field.

According to the present disclosure, the system and method for supporting the precision time synchronization protocol of the stealth clock type can calculate the node delay times of the delay request messages of all follower nodes with a small number of messages in a linear network, thereby reducing the number of messages, reducing bandwidth, and easily performing failure recovery.

BRIEF DESCRIPTION OF THE DRAWINGS

FIG. 6 is a diagram illustrating the structure of a time synchronization message according to an embodiment of the present disclosure.

DETAILED DESCRIPTION

The precision time protocol (PTP) is a protocol used to synchronize the clocks of two nodes (leader and follower) through message exchange. Here, in order to synchronize the time of the clock of the follower with the time of the clock of the leader, ① a sync message which is a message sent by the leader to the follower, ② a follow-up message which is a message sent by the leader to the follower, ③ a delay-request message which is a message sent by the follower to the leader, and ④ a delay-response message which is a message sent by the leader to the follower are exchanged.

In addition, the leader and the follower measure the egress and ingress times of messages by using their own clocks. Specifically, the leader measures an egress time $t_1$ of the sync message, the follower measures an ingress time $t_2$ of the sync message, the follower measures an egress time $t_3$ of the delay-request message, and the leader measures an ingress time $t_4$ of the delay-request message.

In this case, the leader transmits the measured times $t_1$ and $t_4$ to the follower through the follow-up message and the delay-response message, respectively, and the follower synchronizes the time of its own clock with the time of the leader's clock by using the times measured by itself and the times measured by the leader.

Meanwhile, as conventional time synchronization techniques, the boundary clock (BC) type has a problem in that clock errors are accumulated, and the transparent clock (TC) type has a problem in that a lot of traffic occurs because the leader and each follower must individually synchronize time.

Figure 1:
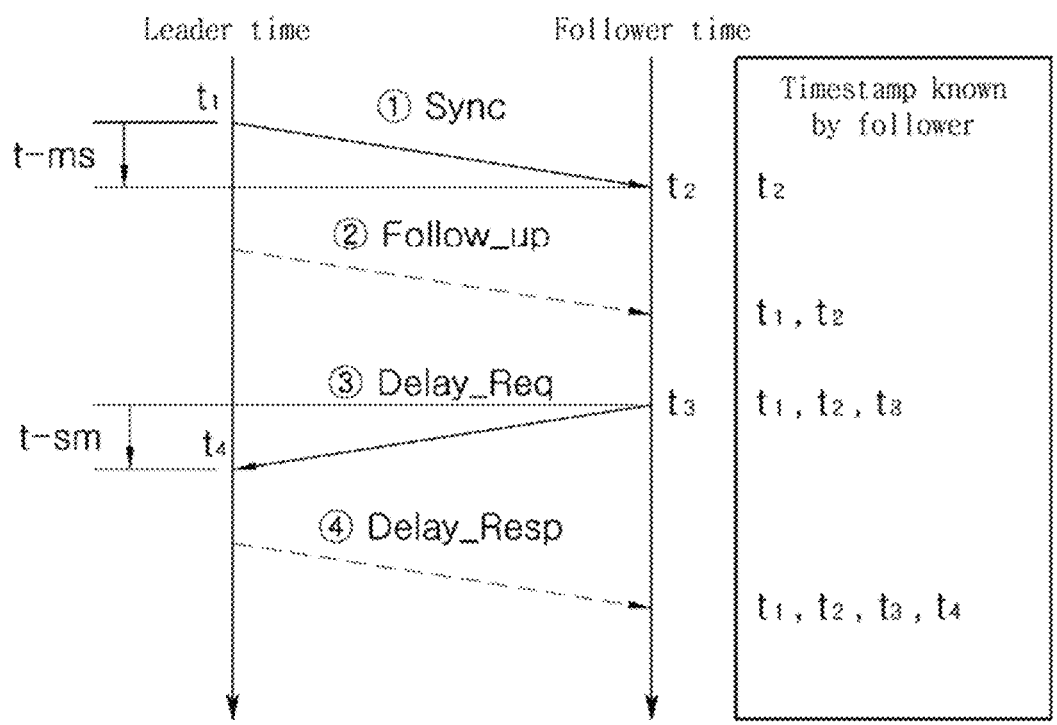
FIG. 1 is a diagram illustrating the exchange of time synchronization messages in accordance with a precision time synchronization type.
Figure 2:
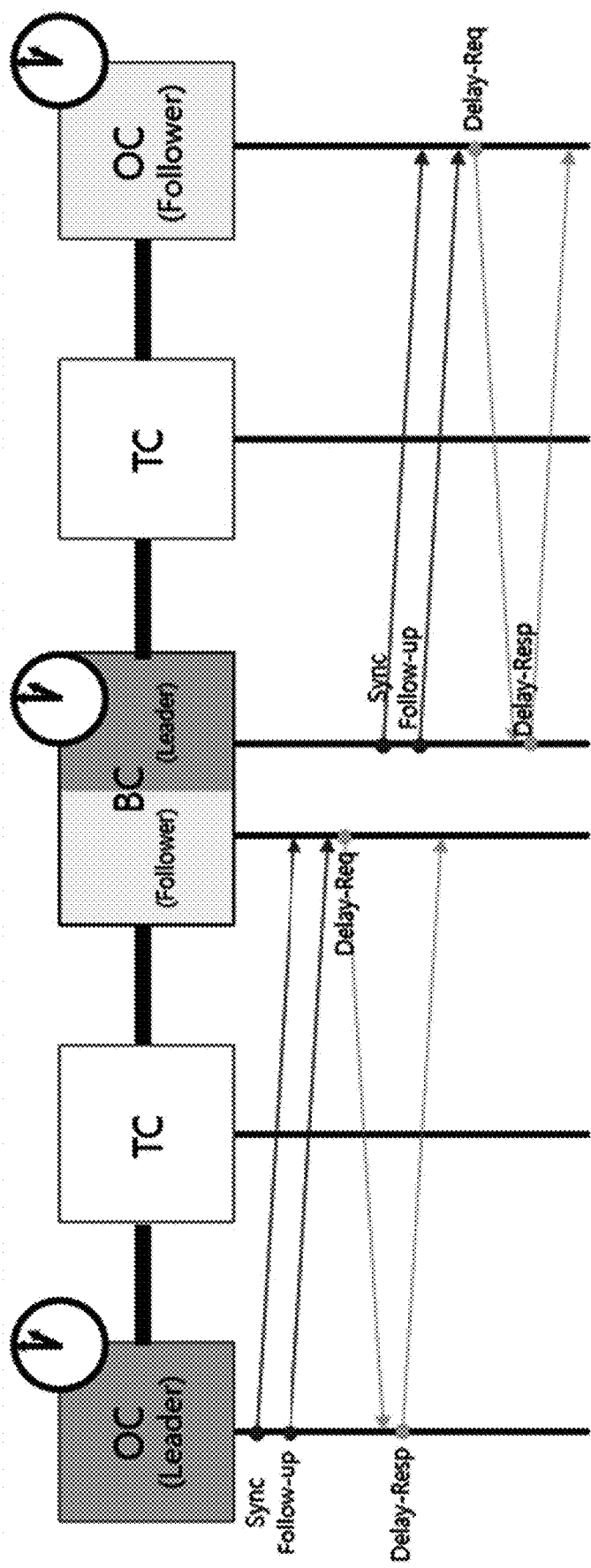
FIG. 2 is a diagram illustrating a conventional system for time synchronization of a boundary clock type in a linear network.

A conventional system for time synchronization in a linear network constructs nodes existing between a leader node and a follower node as transparent clock nodes in order to synchronize time between a leader device and an end-follower device that are separated from each other. Here, the transparent clock node is not a follower and transmits a time synchronization message as a bridge only performing other auxiliary roles without performing time synchronization. In order for an intermediary node to perform time synchronization, the boundary clock (BC) type is used as shown in FIG. 2. In the BC type, a port independently exchanges time synchronization messages with a leader node and a follower node. However, because the BC type system has a problem in which clock errors are accumulated, the size of errors increases as time passes.

In order to solve this problem, the present disclosure supports precision time synchronization by using a stealth clock type. Hereinafter, an embodiment of the present disclosure will be described in detail with reference to the accompanying drawings. In the drawings, like elements may be denoted by the same reference numerals. In the description of the present disclosure, when it is determined that a detailed description of a related well-known configuration or function is obvious to those skilled in the art or may obscure the subject matter of the present disclosure, the detailed description will be omitted.

Figure 3:
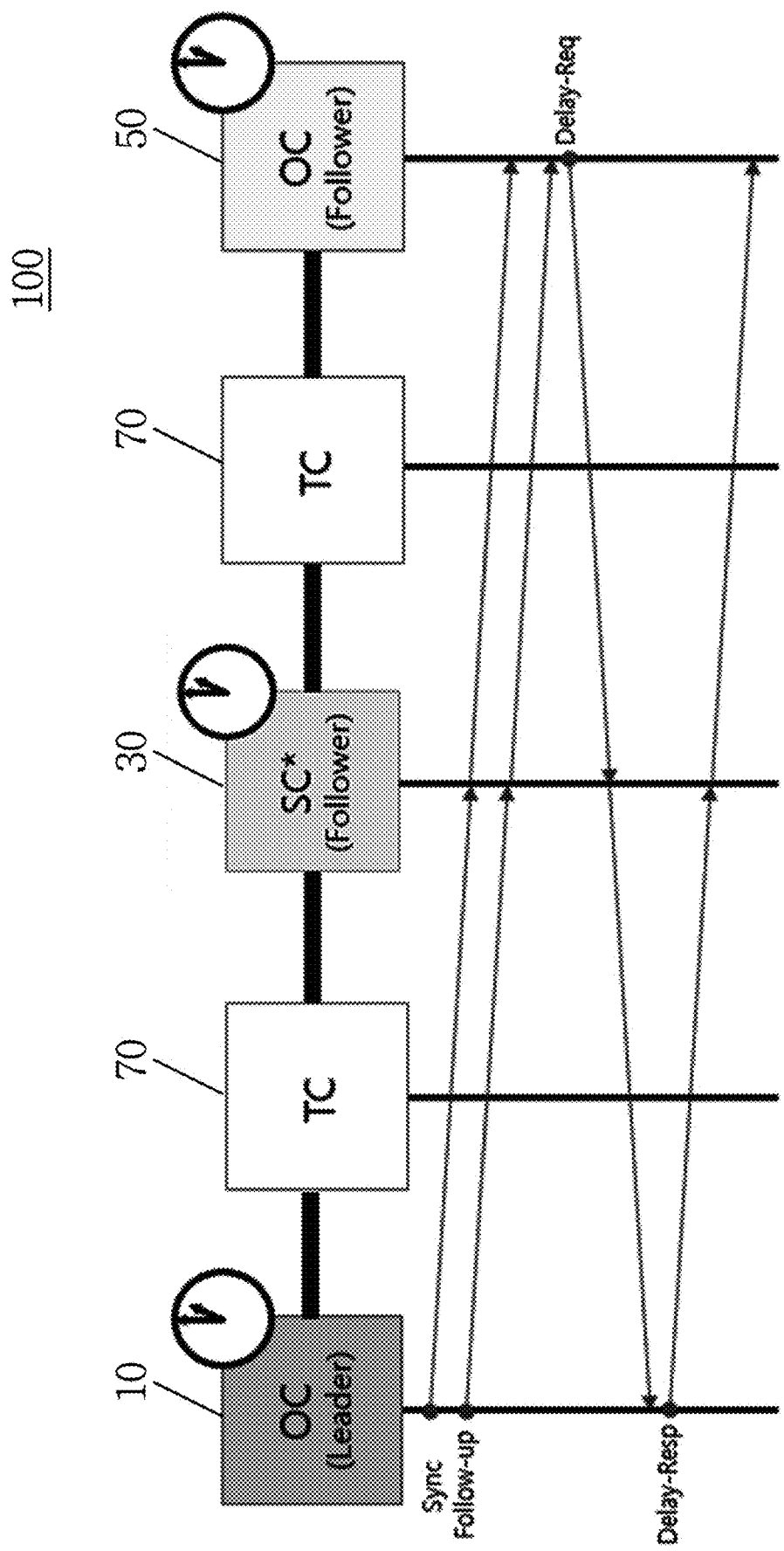
FIG. 3 is a diagram illustrating a system for time synchronization of a stealth clock type in a linear network according to an embodiment of the present disclosure.
Figure 4:
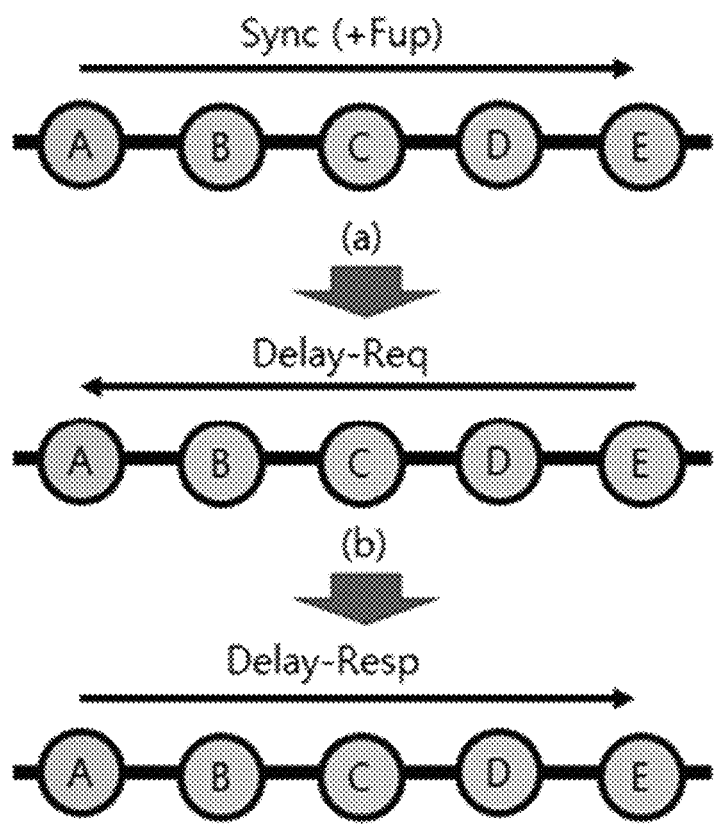
FIG. 4 is a diagram illustrating a process of transmitting and receiving time synchronization messages according to an embodiment of the present disclosure.
Figure 5:
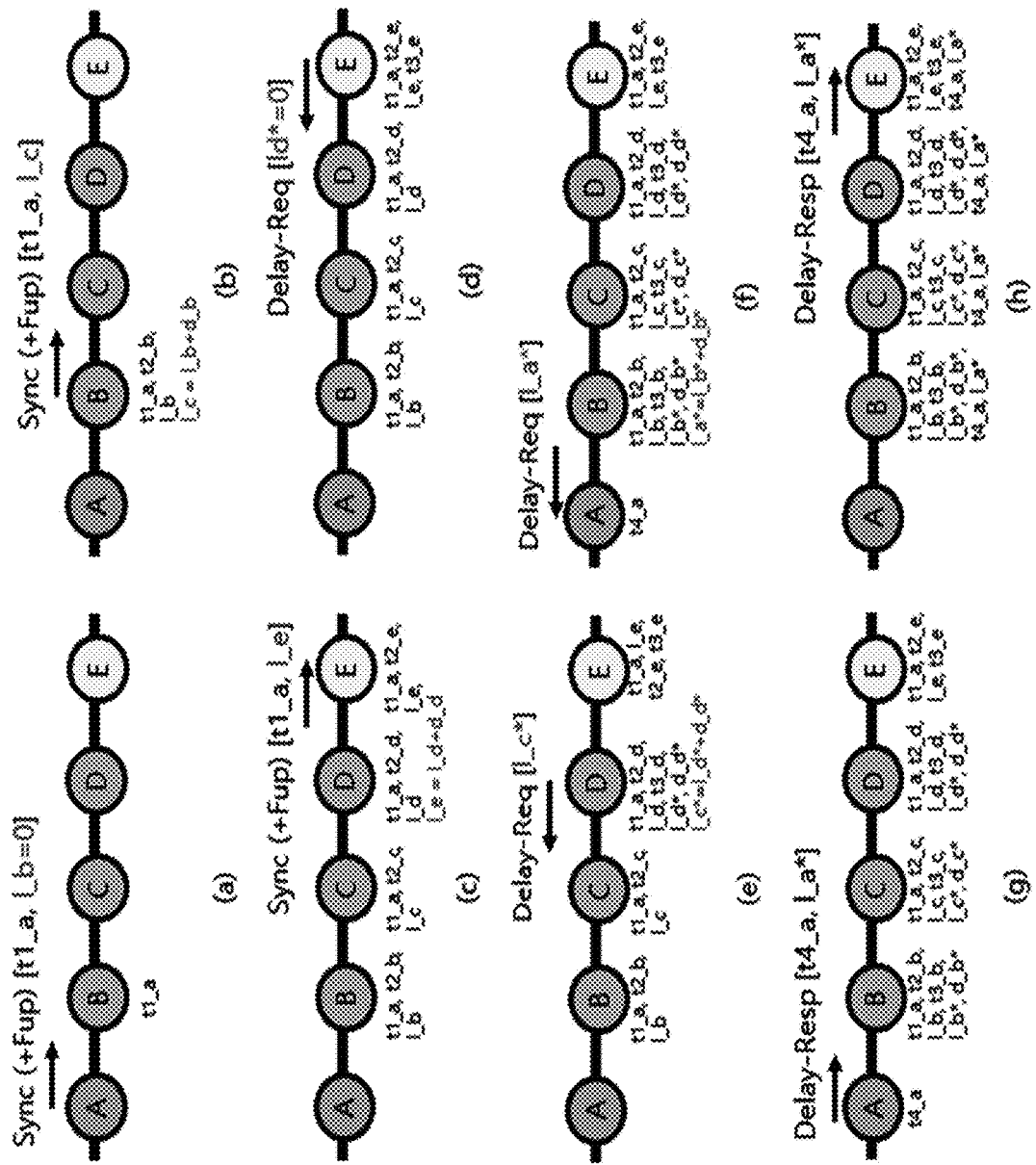
FIG. 5 is a diagram specifically illustrating the process of transmitting and receiving time synchronization messages shown in FIG. 4.

FIG. 3 is a diagram illustrating a system for time synchronization of a stealth clock type in a linear network according to an embodiment of the present disclosure. FIG. 4 is a diagram illustrating a process of transmitting and receiving time synchronization messages according to an embodiment of the present disclosure. FIG. 5 is a diagram specifically illustrating the process of transmitting and receiving time synchronization messages shown in FIG. 4.

Referring to FIGS. 3 to 5, the system 100 is implemented in a linear network and includes a leader device 10, a stealth clock follower device 30, and an end-follower device 50. The leader device 10 and the end-follower device 50 operate based on an ordinary clock (OC), and form the beginning and the end of the linear network, respectively. The leader device 10 is located at a leader node (also referred to as a master node), generates a sync message and a delay-response message, and transmits them to the end-follower device 50. The end-follower device 50 is located at the end of a plurality of follower nodes (also referred to as slave nodes), generates a delay-request message, and transmits it to the leader device 10. The stealth clock follower device 30 operates based on a stealth clock (SC), and is positioned between the leader device 10 and the end-follower device 50 to act as a follower device that mediates the leader device 10 and the end-follower device 50. In this case, the system 100 may further include a transparent clock follower device 70 between the leader device 10 and the stealth clock follower device 30 and/or between the stealth clock follower device 30 and the end-follower device 50.

For example, as shown in FIGS. 4 and 5, the system 100 may be composed of node A to node E, and each node may be implemented as a device suitable for that node. Here, the node A and the node E may operate based on the normal clock, node B to node D may operate based on the stealth clock. In addition, the node A may correspond to a leader node, and the node B to the node E may correspond to follower nodes. The system 100 supports all follower nodes to synchronize their own time with the leader node's time through a time synchronization protocol. Hereinafter, a process of the system 100 in which the leader node and the follower nodes obtain time information required for time synchronization will be described.

The node A transmits a sync message, which is a multicast message. At this time, the node A measures a time $t1\_a$ at which the sync message is transmitted, and loads it into the sync message. Alternatively, the node A may load, into the follow-up message, the time $t1\_a$ at which the sync message is transmitted. At this time, a correction field of the sync message or follow-up message is 0 (see (a) in FIG. 5). The node B measures an ingress time $t2\_b$ when the sync message passes, and changes the correction field to $1\_c=1\_b+d\_b$ by accumulating a delay time $d\_b$ of the node B (see (b) in FIG. 5). The node E receives the sync message or follow-up message passed through the node C and the node D. At this time, a follower node X (where X is any one of B, C, D, and E) has $t1\_a$, $t2\_x$, and $1\_x$ in which delay times of follower nodes existing between itself and the leader node A are accumulated (see (c) in FIG. 5). The node E transmits a delay-request message and measures an egress time t3_e at which the delay-request message is transmitted (see (d) in FIG. 5). The node D measures an ingress time t3_d when the delay-request message passes, measures a delay time d_d*, and accumulates it in the correction field (see (e) in FIG. 5). Upon receiving the delay-request message from the node E, the node A has 1_a*, and the node X has t1_a, t2_x, 1_x, t3_x, 1_x*, and d_x*. In addition, the node A measures an ingress time t4_a at which the delay-request message is received (see (f) in FIG. 5).

The node A transmits, to the node E, a delay-response message in which t4_a and 1_a* are loaded (see (g) in FIG. 5). When the delay-response message is transmitted to the node E, the follower node X has t1_a, t2_x, 1_x, t3_x, 1_x*, d_x*, t4_a, and 1_a*. At this time, the node E is 1_e*=d_e*=0.

Also, the system 100 may calculate a delay and an offset as in Equation 3, based on Equation 1 and Equation 2.

$$A = D + O = t2\_x - t1\_a - 1\_x \qquad \text{[Equation 1]}$$

$$B = D - O = t4\_a - t3\_x - 1\_x'(1\_x' = 1\_a^* - 1\_x^* - d\_x^*) \qquad \text{[Equation 2]}$$

$$\text{Delay} = D = (A+B)/2$$

$$\text{Offset} = O = (A-B)/2 \qquad \text{[Equation 3]}$$

FIG. 6 is a diagram illustrating the structure of a time synchronization message according to an embodiment of the present disclosure. In FIG. 6, (a) shows the structure of a conventional time synchronization message, and (b) shows the structure of an expanded time synchronization message.

Referring to FIGS. 3 and 6, in case that a leader device does not support a function of loading an egress time at the same time as transmitting a sync message, a follow-up message has been additionally used in general. However, the system 100 may have an expanded message structure in order not to use device (hardware) support or additional messages.

The sync message and the delay-request message are messages used only to measure time and thus do not deliver time information, and only the delay-response message conveys time information. To this end, at least one of the sync message, the delay-request message, and the delay-response message contains one or more timestamp fields and a corresponding number of correction fields. For example, the delay-request message or delay-response message may load and deliver measured time information in two timestamp fields t1 and t4 and two correction fields 1_x and 1_x'.

Here, t1 is the egress time when the leader node transmits the sync message, and t4 is the ingress time when the leader node receives the delay-request message. Also, 1_x is the delay time accumulated in follower nodes between the follower node X and the leader node with respect to the sync message, and 1_x' is the delay time accumulated in follower nodes between the follower node X and the leader node with respect to the delay-request message.

Figure 7:
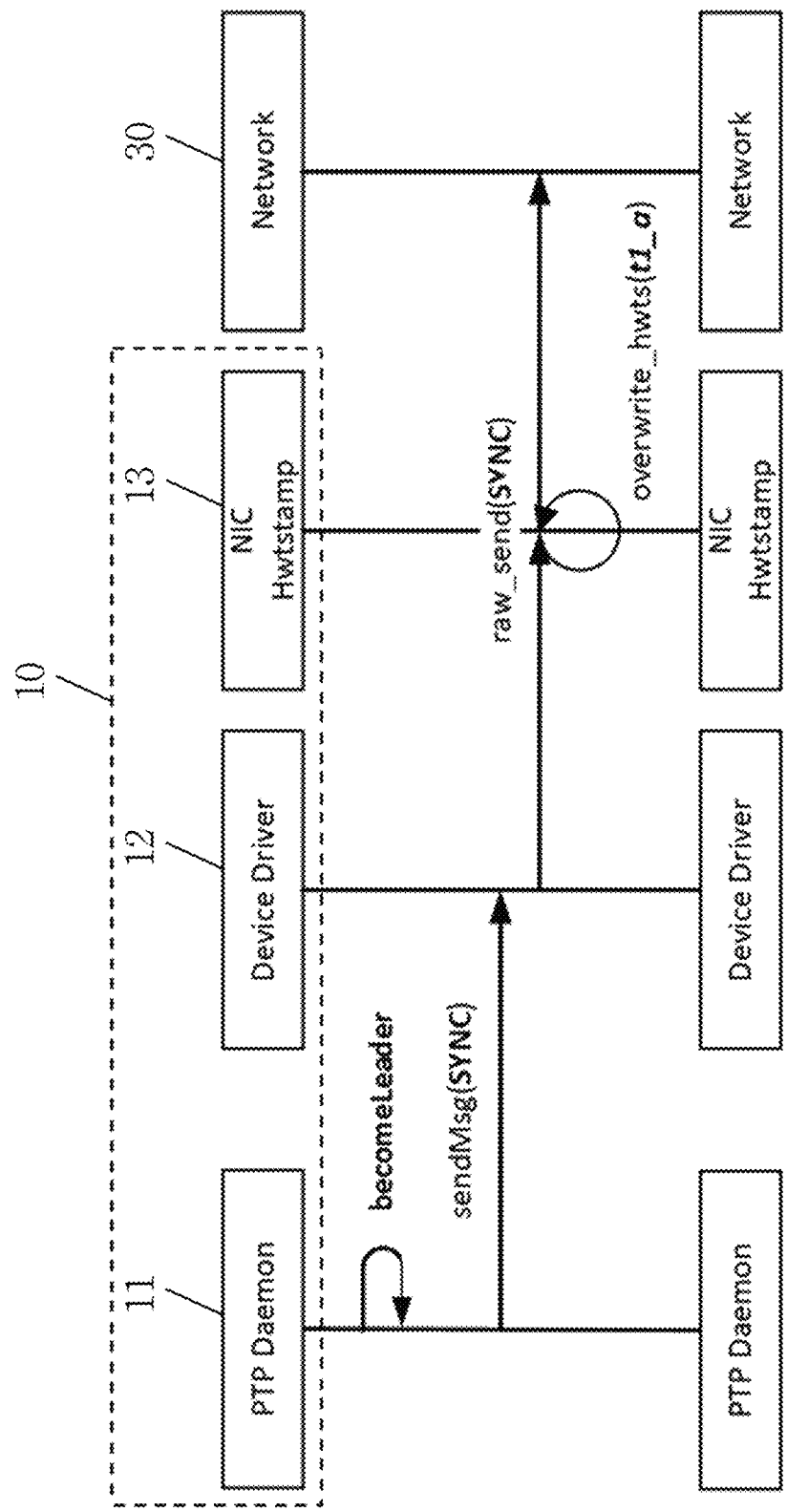
FIG. 7 is a diagram illustrating the transmission of a sync message by a leader device according to an embodiment of the present disclosure.
Figure 8:
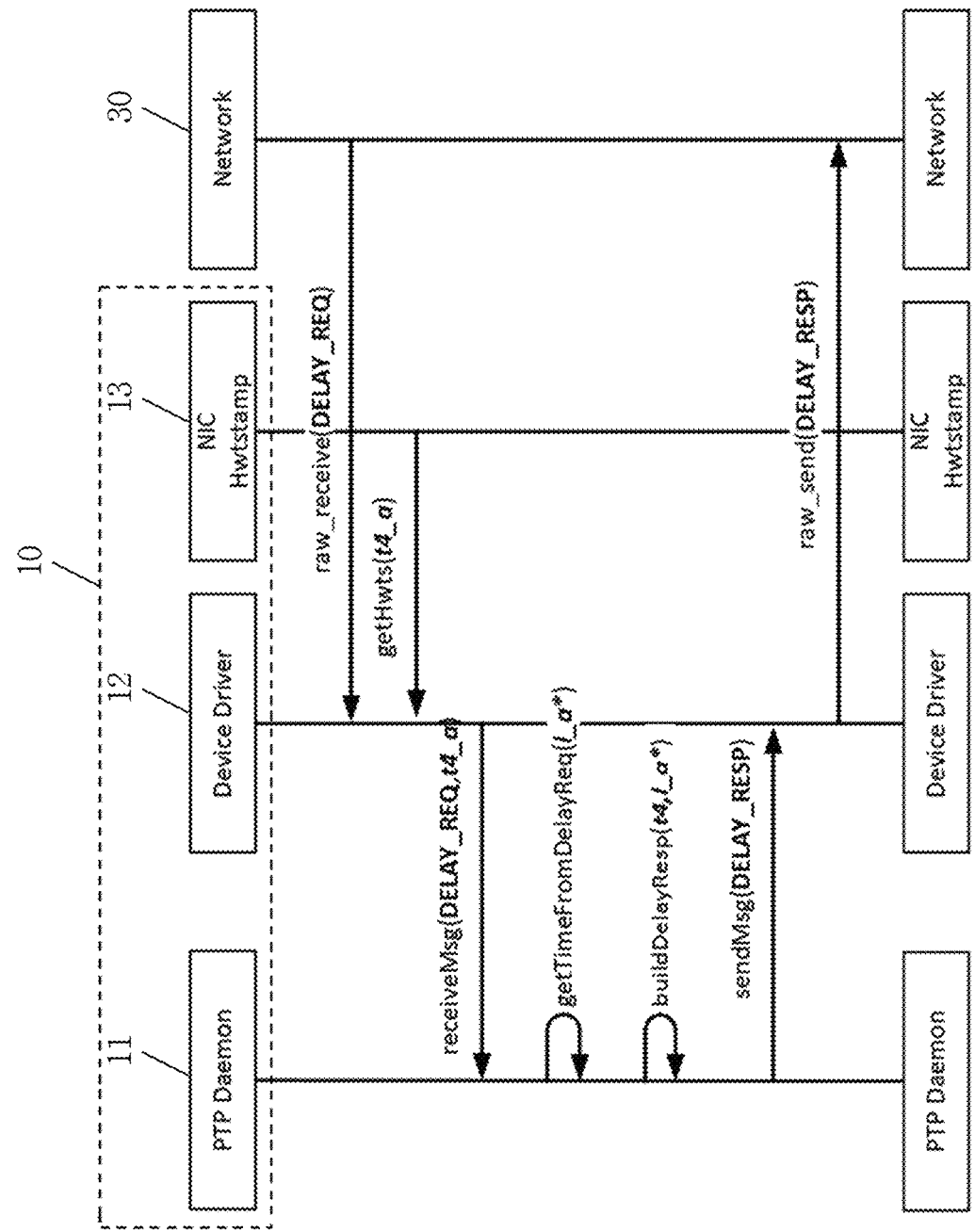
FIG. 8 is a diagram illustrating the reception of a delay-request message and the transmission of a delay-response message by a leader device according to an embodiment of the present disclosure.

FIG. 7 is a diagram illustrating the transmission of a sync message by a leader device according to an embodiment of the present disclosure. FIG. 8 is a diagram illustrating the reception of a delay-request message and the transmission of a delay-response message by a leader device according to an embodiment of the present disclosure.

Referring to FIGS. 7 and 8, the leader device 10 includes a PTP engine 11, a device driver 12, and an NIC 13.

In case of transmitting the sync message, the PTP engine 11 transmits the sync message to the device driver 12, and the device driver 12 transmits the sync message to the NIC 13. Then, the NIC 13 loads the measured transmission hardware timestamp t1_a in the origin timestamp area of the sync message and transmits it to the network 30 having the end-follower device (see FIG. 7).

Also, in case of receiving the delay-request message, the PTP engine 11 loads the hardware timestamp t4_a measured by the NIC 13 and 1_a* loaded in the correction field of the delay-request message into the origin timestamp and correction field of the delay-response message, respectively, and sends the delay-response message to the device driver 12. The device driver 12 transmits the received delay-response message to the network 30 (see FIG. 8).

Figure 9:
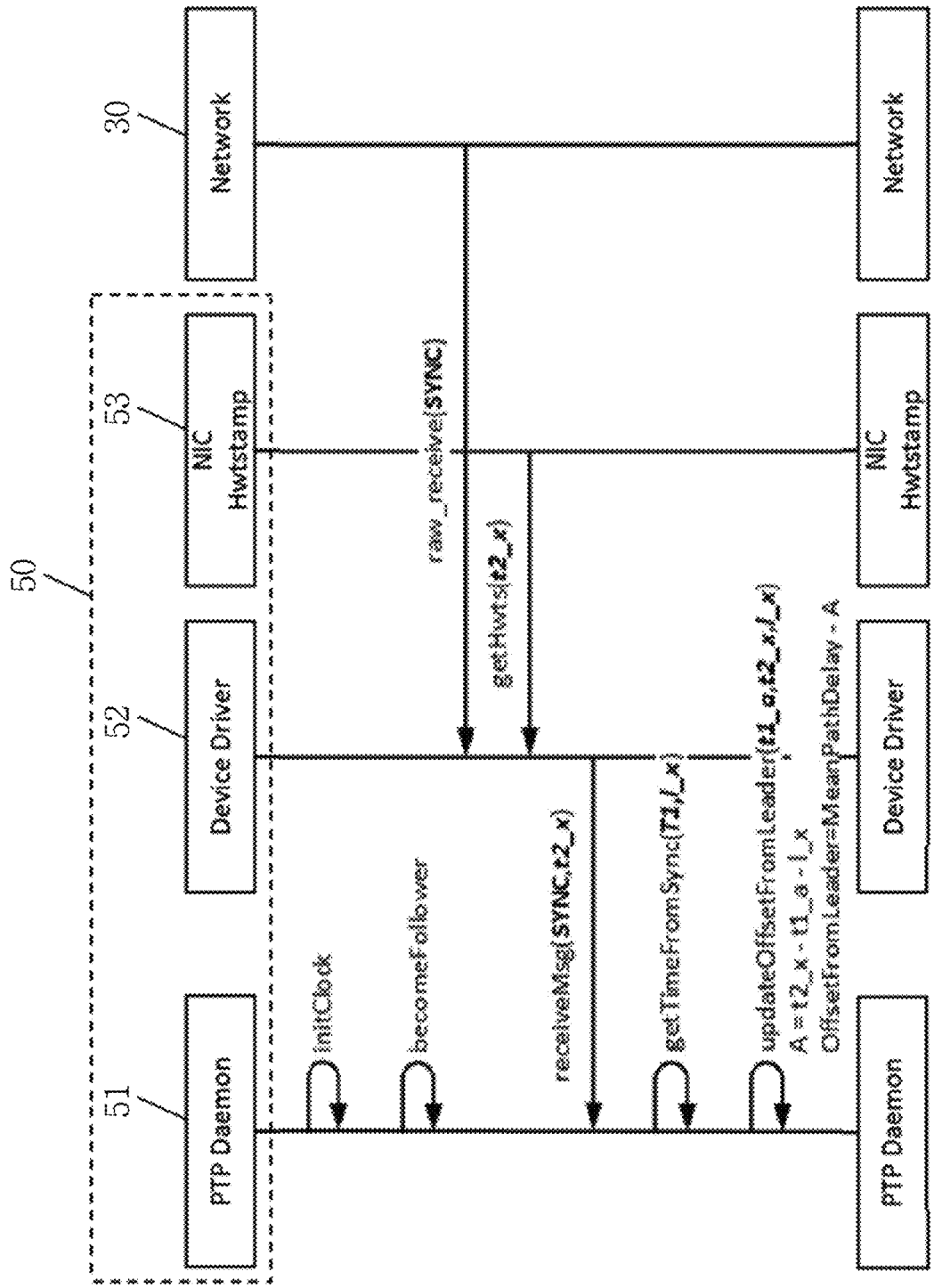
FIG. 9 is a diagram illustrating the reception of a sync message by an end-follower device according to an embodiment of the present disclosure.
Figure 10:
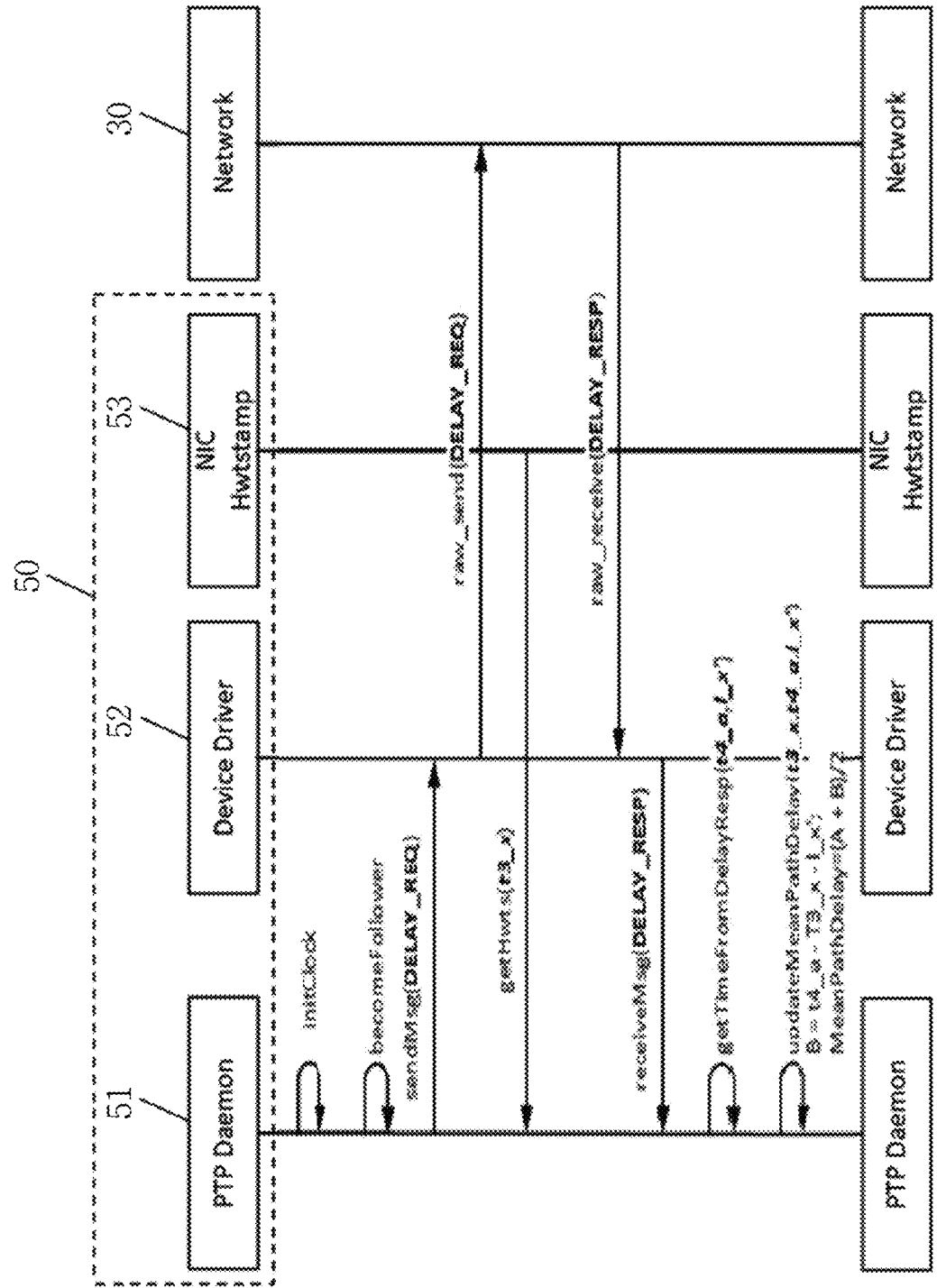
FIG. 10 is a diagram illustrating the transmission of a delay-request message and the reception of a delay-response message by an end-follower device according to an embodiment of the present disclosure.

FIG. 9 is a diagram illustrating the reception of a sync message by an end-follower device according to an embodiment of the present disclosure. FIG. 10 is a diagram illustrating the transmission of a delay-request message and the reception of a delay-response message by an end-follower device according to an embodiment of the present disclosure.

Referring to FIGS. 9 and 10, the end-follower device 50 includes a PTP engine 51, a device driver 52, and an NIC 53.

In case of receiving the sync message, the PTP engine 51 obtains the received hardware timestamp t2 measured by the NIC 53, obtains t1_a and 1_x from the origin timestamp and correction field of the sync message, and then updates the leader offset (OffsetFromLeader) (see FIG. 9).

Also, in case of receiving the delay-response message, the PTP engine 51 obtains t4_a and 1_x' (1_x'=1_a*) from the receive timestamp and correction field of the delay-response message, and updates the mean path delay (see FIG. 10).

Figure 11:
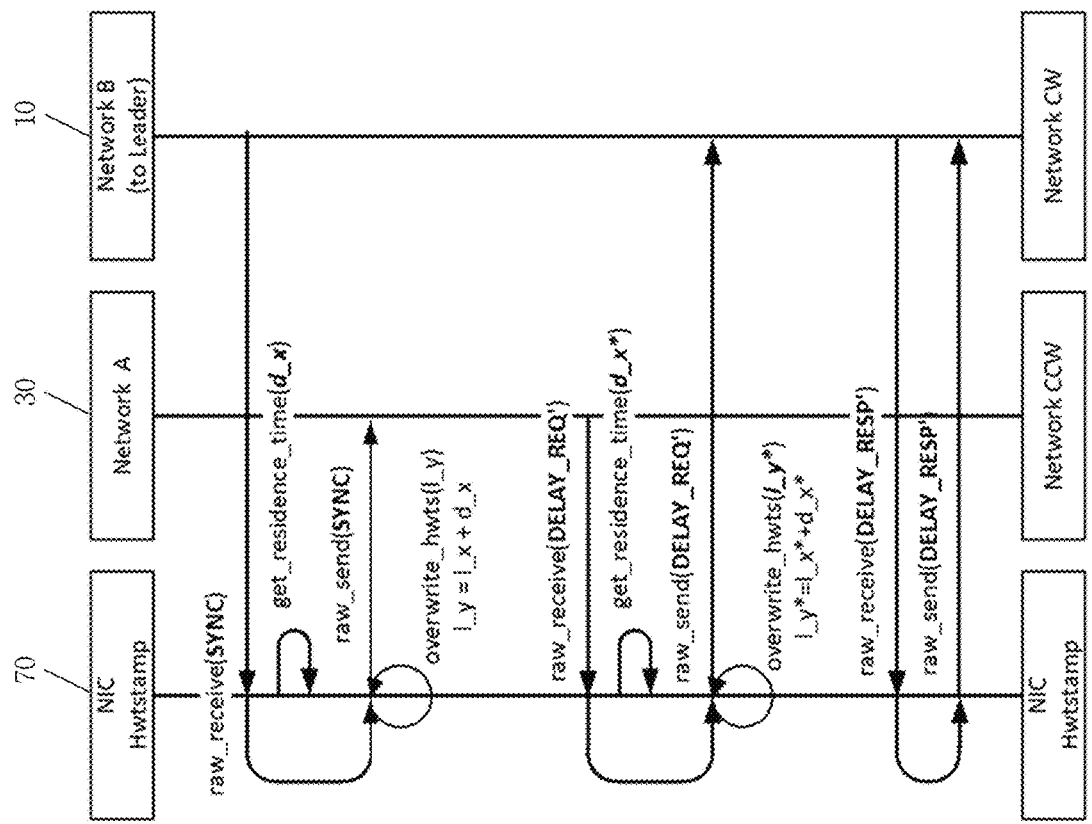
FIG. 11 is a diagram illustrating the transmission and reception of a sync message, delay-request message, and delay-response message by a transparent clock follower device according to an embodiment of the present disclosure.

FIG. 11 is a diagram illustrating the transmission and reception of a sync message, delay-request message, and delay-response message by a transparent clock follower device according to an embodiment of the present disclosure.

Referring to FIGS. 3 and 11, the transparent clock follower device 70 includes only an NIC because of requiring no PTP engine.

The NIC measures the node delay time d_x for the sync message and the delay-request message passing, through the hardware timestamp, and updates the correction field by accumulating it. In this case, the NIC does not update the correction field of the delay-response message and transmits it, as it is received, to the network B 10 in the direction of the leader node.

Figure 12:
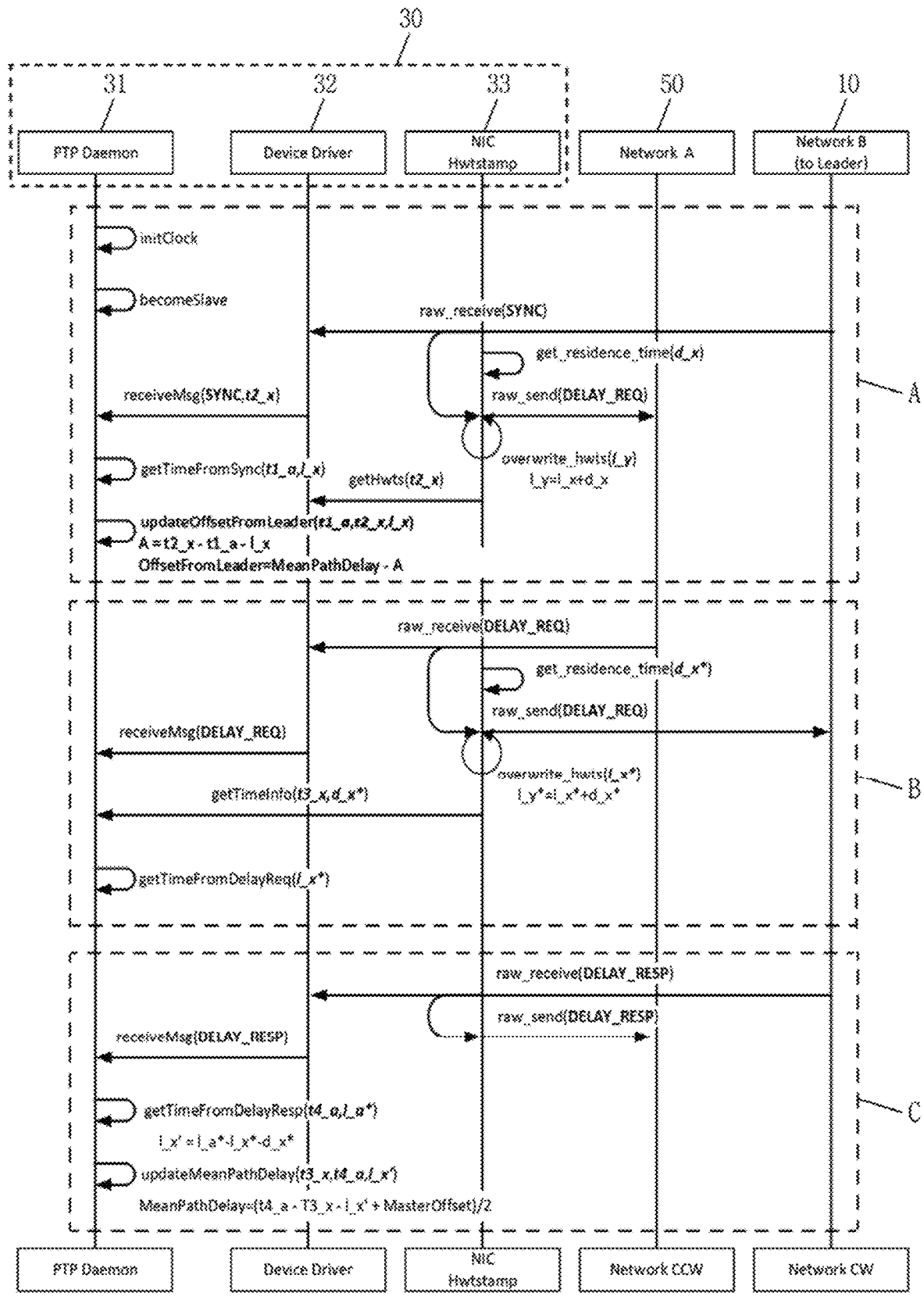
FIG. 12 is a diagram illustrating the transmission and reception of a sync message, delay-request message, and delay-response message by a stealth clock follower device according to an embodiment of the present disclosure.
Figure 13:
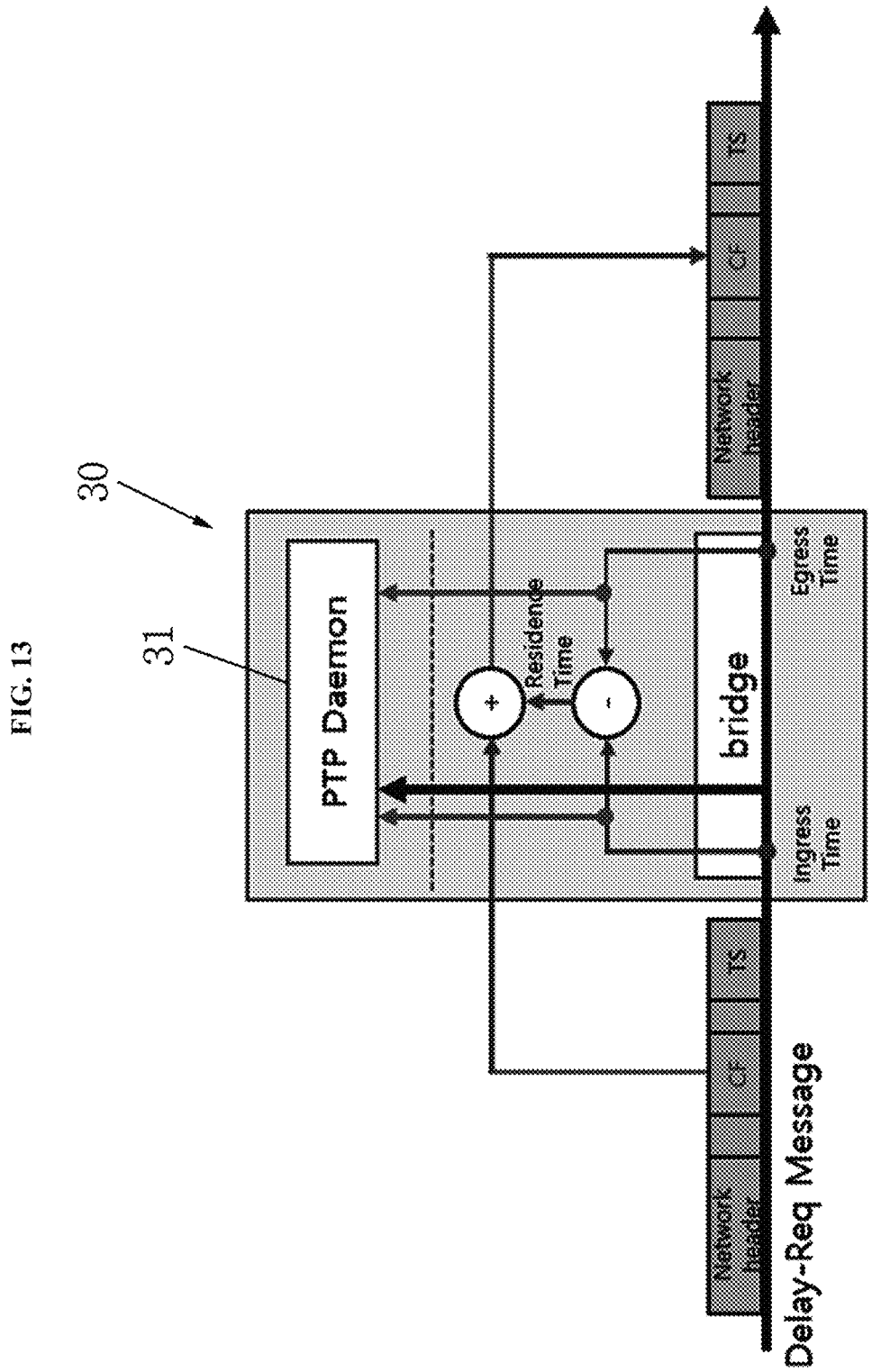
FIG. 13 is a diagram illustrating the update of a node delay time of a stealth clock follower device according to an embodiment of the present disclosure.

FIG. 12 is a diagram illustrating the transmission and reception of a sync message, delay-request message, and delay-response message by a stealth clock follower device according to an embodiment of the present disclosure. FIG. 13 is a diagram illustrating the update of a node delay time of a stealth clock follower device according to an embodiment of the present disclosure.

Referring to FIGS. 12 and 13, without generating the delay-request message unlike a conventional follower node operating based on the ordinary clock (OC), the stealth clock follower device 30 receives the sync message transmitted by the leader node and the delay-request message transmitted by another follower node, and transmits the received messages to the node device in the opposite direction. The stealth clock follower device 30 includes a PTP engine 31, a device driver 32, and an NIC 33.

When the NIC 33 of the follower node X, which is the stealth clock follower device 30, receives the sync message transmitted by the leader node from the network B 10 in the direction of the leader node, the NIC 33 delivers the sync message to the device driver 32 and also transmits it to the network A 50 in the opposite direction. In this case, the NIC 33 measures the ingress time t2_x and accumulates the node delay time d_x in the correction field. The PTP engine 31 obtains t1_a and 1_x from the received sync message, obtains t2_x from the NIC 32, and updates MasterOffset by using t1_a, t2_x, and 1_x (see section A).

When the NIC 33 receives the delay-request message from the network A 50, the NIC 33 delivers the delay-request message to the device driver 32 and also transmits it to the network B 10. In this case, the NIC 33 accumulates the node delay time d_x* in the correction field and measures the egress time t3_x. The PTP engine 31 obtains 1_x* from the received delay-request message, and obtains t3_x and d_x* from the NIC 33 (see section B).

When the NIC 33 receives the delay-response message from the network B 10, the NIC 33 delivers the delay-response message to the device driver 32 and also transmits it to the network A 30. The PTP engine 31 obtains t4_a and 1_a* from the received delay-response message, calculates 1_x' from 1_a*, 1_x*, and d_x*, and updates MeanPathDelay by using t4_a, t3_x, and 1_x' (see section C).

Meanwhile, in order to share the delay-request message and the delay-response message with another follower device that operates based on the ordinary clock (OC), the stealth clock follower device 30 delivers, to the PTP engine 31, the ingress time (ingress time), the egress time (egress time), and the time accumulated in the correction field with respect to a bridging message. That is, with respect to the delay-request message transmitted by a node device operating based on the OC, the stealth clock follower device 30 may send at least one of the egress/ingress time of the corresponding message, the residence time, and that message to the PTP engine 31.

Figure 14:
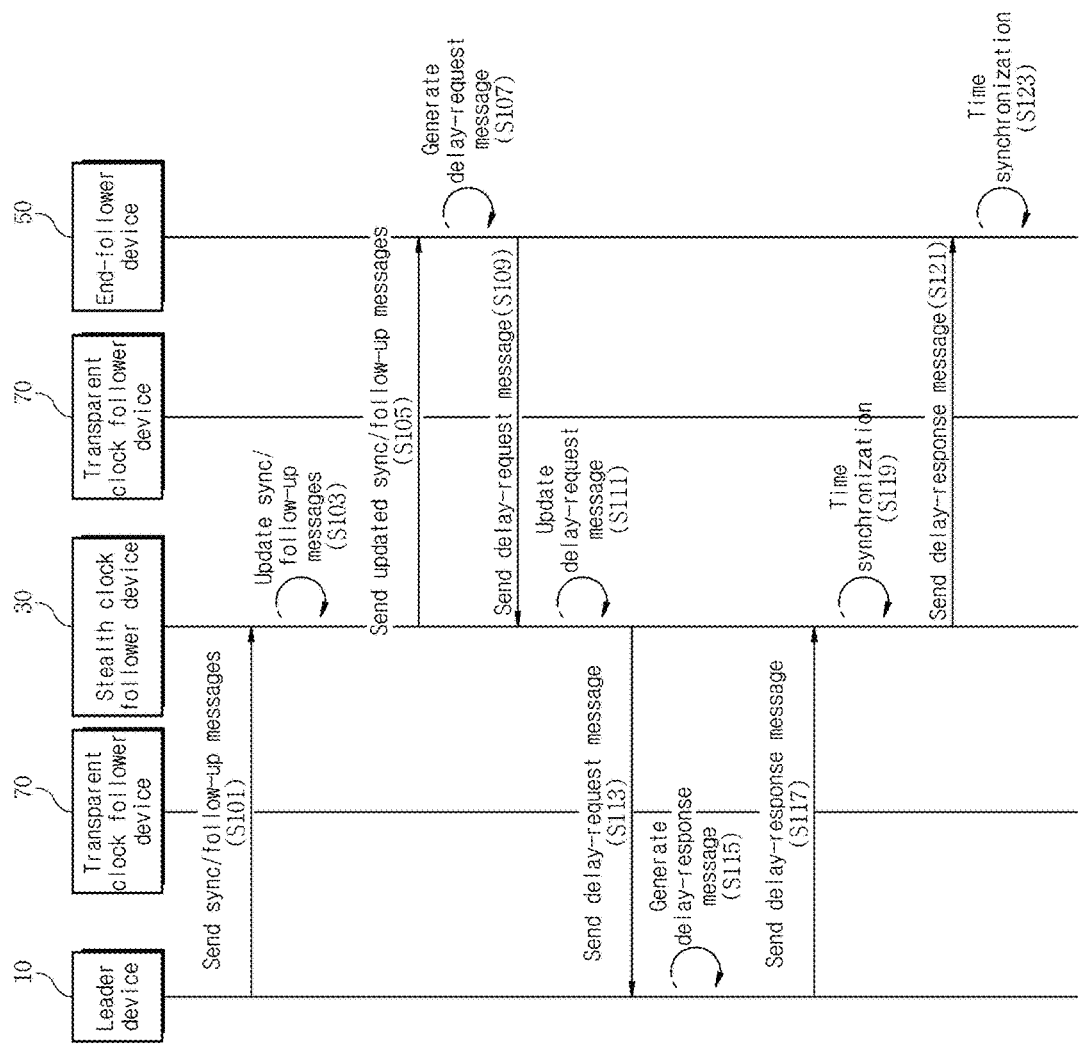
FIG. 14 is a diagram illustrating a method for time synchronization of a stealth clock type in a linear network according to an embodiment of the present disclosure.

FIG. 14 is a diagram illustrating a method for time synchronization of a stealth clock type in a linear network according to an embodiment of the present disclosure.

Referring to FIG. 14, the method for time synchronization can calculate the node delay times of the delay request messages of all follower nodes with a small number of messages in a linear network, thereby reducing the number of messages, reducing bandwidth, and easily performing failure recovery.

At step S101, a leader device 10 transmits a sync message. The leader device 10 may further transmit a follow-up message after transmitting the sync message. The leader device 10 operates based on the ordinary clock (OC) and corresponds to the beginning of a linear network. Here, the sync message and the follow-up message may pass through at least one transparent clock follower device 70, and the transparent clock follower device 70 serves as a mediator of messages.

At step S103, a stealth clock follower device 30 updates at least one of the sync message and follow-up message received from a neighbor device. At this time, the stealth clock follower device 30 measures and records the ingress time of at least one of the received sync message and follow-up message. Also, the stealth clock follower device 30 updates the node delay time of the sync message in the correction field of the sync message. Here, the neighbor device may be the transparent clock follower device 70 through which the sync message and the follow-up message pass.

At step S105, the stealth clock follower device 30 transmits the updated sync message to an end-follower device 50. The stealth clock follower device 30 may transmit the updated sync message and then further transmit a follow-up message to the end-follower device 50. The updated sync message and the follow-up message may pass through at least one transparent clock follower device 70.

At step S107, the end-follower device 50 generates a delay-request message based on at least one of the sync message and follow-up message received from a neighbor device. The end-follower device 50 operates based on the ordinary clock (OC) and corresponds to the end of the linear network.

At step S109, the end-follower device 50 transmits the generated delay-request message to the stealth clock follower device 30. The delay-request message may pass through at least one transparent clock follower device 70.

At step S111, the stealth clock follower device 30 updates the delay-request message received from the neighbor device. The stealth clock follower device 30 updates the node delay time in the correction field of the delay-request message. At this time, the stealth clock follower device 30 may further update at least one of a egress/ingress time and an residence time of the delay-request message in the correction field.

At step S113, the stealth clock follower device 30 transmits the updated delay-request message to the leader device 10. At this time, the stealth clock follower device 30 measures and records the egress time of transmitting the updated delay-request message. The delay-request message may pass through at least one transparent clock follower device 70.

At step S115, the leader device 10 generates a delay-response message based on the delay-request message received from a neighbor device. Here, the delay-request message is a delay-request message updated by the stealth clock follower device 30, and the delay-response message is a message corresponding to the delay-request message and contains information for time synchronization.

At step S117, the leader device 10 transmits the generated delay-response message to the stealth clock follower device 30. The delay-response message may pass through the at least one transparent clock follower device 70.

At step S119, the stealth clock follower device 30 performs time synchronization. The stealth clock follower device 30 performs a time synchronization operation for synchronizing its own time with the time of the leader device 10 by using the ingress time of the sync message measured at step S103, the egress time of the delay-request message measured at step S111, and the time information contained in the sync message, the follow-up message, and the delay-response message.

At step S121, the stealth clock follower device 30 transmits the delay-response message received from the neighbor device to the end-follower device 50. The delay-response message may pass through the at least one transparent clock follower device 70.

At step S123, the end-follower device 50 performs time synchronization based on the delay-response message received from the neighbor device. Through this, the end-follower device 50 may perform synchronization based on the time of the leader device 30.

The method according to embodiments of the present disclosure may be provided in the form of a non-transitory computer-readable recording medium suitable for storing computer program instructions and data. The computer-readable recording medium may include program instructions, data files, data structures, etc. alone or in combination, and includes all kinds of recording devices in which data that can be read by a computer system is stored. The computer-readable recording medium includes a hardware device specially configured to store and execute program instructions, including magnetic media such as a hard disk, a floppy disk, and a magnetic tape, optical media such as a compact disc read only memory (CD-ROM) and a digital versatile disc (DVD), magneto-optical media such as a floptical disk, and semiconductor memories such as a read only memory (ROM), a random access memory (RAM), and a flash memory. Further, the computer-readable recording medium may be distributed over networked computer systems so that computer-readable code can be stored and executed in a distributed fashion. In addition, functional programs, associated codes, and code segments for implementing the present disclosure may be easily deduced or altered by programmers in the art to which the present disclosure belongs.

Although embodiments to illustrate the technical subject matter of the present disclosure are described above, the present disclosure is not limited to the configuration and operation of such embodiments, and various changes and modifications to the present disclosure can be made as well understood by those skilled in the art without departing from the technical subject matter. Accordingly, all such appropriate changes and modifications and their equivalents should be considered to be within the scope of the present disclosure.

What is claimed is:

1. A method for supporting a precision time synchronization protocol implemented in a linear network comprising a leader device, an end-follower device, and an intermediate clock follower device, the method comprising:
   receiving, by the intermediate clock follower device, a sync message generated by the leader device,
   transmitting, by the intermediate clock follower device, the sync message to the end-follower device;
   receiving, by the intermediate clock follower device, a delay-request message generated by using the sync message from the end-follower device;
   updating, by the intermediate clock follower device, a residence time in a correction field of the received delay-request message;
   transmitting, by the intermediate clock follower device, the updated delay-request message to the leader device;
   receiving, by the intermediate clock follower device, a delay-response message generated by the leader device using the updated delay-request message;
   performing, by the intermediate clock follower device, time synchronization based on a time of the leader device by using an ingress time of the sync message, an egress time of the updated delay-request message, and time information contained in the sync message and the delay-response message; and
   transmitting, by the intermediate clock follower device, the delay-response message to the end-follower device such that the end-follower device is time-synchronized based on the time of the leader device.

2. The method of claim 1, further comprising:
   before transmitting the sync message to the end-follower device,
   measuring and recording, by the intermediate clock follower device, an ingress time of receiving the sync message; and
   updating, by the intermediate clock follower device, a node delay time of the sync message in a correction field of the sync message.

3. The method of claim 1, further comprising:
   before receiving the delay-request message,
   transmitting, by the intermediate clock follower device, a follow-up message received from the leader device to the end-follower device.

4. The method of claim 1, further comprising:
   after transmitting the updated delay-request message to the leader device,
   measuring and recording an egress time of the updated delay-request message.

5. The method of claim 1, wherein at least one of the sync message, the delay-request message, or the delay-response message includes at least one timestamp field and a number of correction fields corresponding to the timestamp field.

6. The method of claim 1, wherein the linear network comprises at least one additional intermediate device between the leader device and the intermediate clock follower device,
   wherein the intermediate clock follower device receives the sync message and the delay-response message from the leader device via the at least one additional intermediate device, and
   wherein the intermediate clock follower device transmits the delay-request message to the leader device via the at least one additional intermediate device.

7. The method of claim 1, wherein the linear network comprises at least one additional intermediate device between the intermediate clock follower device and the end-follower device,
   wherein the intermediate clock follower device transmits the sync message and the delay-response message to the end-follower device via the at least one additional intermediate device, and
   wherein the intermediate clock follower device receives the delay-request message from the end-follower device via the at least one additional intermediate device.

8. An apparatus for supporting a precision time synchronization protocol implemented in a linear network comprising a leader device and an end-follower device, the apparatus being located between the leader device and the end-follower device, the apparatus comprising:
   a network interface controller (NIC) configured to receive a time synchronization message including a sync message, a delay-request message, and a delay-response message being a response message to the delay-request message, and to transmit the received messages in a direction opposite to a reception direction;
   a precision time protocol (PTP) engine configured to update a residence time in a correction field of the delay-request message, and to perform time synchronization based on a time of the leader device by using an ingress time of the sync message, an egress time of the delay-request message, and time information contained in the sync message and the delay-response message; and
   a device driver located between the NIC and the PTP engine and configured to transmit the time synchronization message received by the NIC to the PTP engine.

9. The apparatus of claim 8, wherein the PTP engine is configured to measure an ingress time of the sync message and an egress time of the delay-request message.

10. The apparatus of claim 8, wherein at least one of the sync message, the delay-request message, or the delay-response message includes at least one timestamp field and a number of correction fields corresponding to the timestamp field.

\* \* \* \* \*